United States Patent [19]

Gaudette

[11] Patent Number: 5,800,718
[45] Date of Patent: Sep. 1, 1998

[54] METHOD FOR TREATING DRY FILM STRIPPING AND DEVELOPING SOLUTION

[75] Inventor: Robert M. Gaudette, 42 Lance Ave., Litchfield, N.H. 03052

[73] Assignee: Robert M. Gaudette, Litchfield, N.H.

[21] Appl. No.: 827,298

[22] Filed: Mar. 28, 1997

Related U.S. Application Data

[63] Continuation-in-part of Ser. No. 382,615, Feb. 2, 1995, Pat. No. 5,615,862.

[51] Int. Cl.$^6$ .................................................. C02F 1/54
[52] U.S. Cl. .......................... 210/714; 210/725; 210/727; 210/731; 210/778; 210/912
[58] Field of Search .................................. 210/714, 719, 210/723, 724, 725, 727, 728, 729, 730, 731, 778, 912

[56] References Cited

U.S. PATENT DOCUMENTS

| | | | |
|---|---|---|---|
| 4,049,545 | 9/1977 | Horvath | 210/724 |
| 4,559,143 | 12/1985 | Asada et al. | 210/728 |
| 4,760,014 | 7/1988 | Wong | 430/399 |
| 4,857,206 | 8/1989 | Choo | 210/724 |
| 4,882,070 | 11/1989 | Wardell | 210/727 |
| 4,999,114 | 3/1991 | Choo | 210/724 |
| 5,106,510 | 4/1992 | Rieber | 210/717 |
| 5,182,029 | 1/1993 | Erb | 210/724 |
| 5,200,086 | 4/1993 | Shah et al. | 210/727 |
| 5,308,502 | 5/1994 | Brown | 210/724 |
| 5,615,862 | 4/1997 | Gaudette | 252/175 |

*Primary Examiner*—Peter A. Hruskoci
*Attorney, Agent, or Firm*—Davis And Bujold

[57] ABSTRACT

A method of treating a spent dry film stripping and/or developing solution comprising the steps of adding about 0.01 to 15 grams of an aluminum source per liter of solution; adding about 0.05 to 25 grams of a metal precipitating agent per liter of solution; mixing the aluminum source, the metal precipitating agent and the solution with one another to form a mixture; adding an acid source to the mixture to lower the pH to less than about 6.5; and filtering the mixture to separate the metals and the photoresist from the remainder of the solution. The composition may also include 0 to 10 percent by weight of a dust-suppression agent, per liter of the solution, 0.1 to 10 grams of siliceous particulates per liter of spent stripper solution and/or an agent to enhance flocculation of the polymer precipitate.

19 Claims, 1 Drawing Sheet

METHOD FOR TREATING DRY FILM STRIPPING AND DEVELOPING SOLUTION

This application is a continuation-in-part of application Ser. No. 08/382,615 filed on Feb. 2, 1995 now U.S. Pat. No. 5,615,862.

FIELD OF THE INVENTION

The present invention relates in general to the effective waste treatment and handling of materials used in the dry film image application process, a process used in the printed circuit board and chemical milling industries. In particular, the present invention relates to a novel composition used to treat the spent stripping and developing solution(s) (to remove plastic and metals) used in the removal of either polymerized or non-polymerized dry film that has been applied to a substrate. In addition, the invention relates to a method for treating used (spent) alkaline stripper solutions which is simple to use, provides effective removal of metals and plastic, and does not lead to a buildup of material in equipment associated with the process.

BACKGROUND OF THE INVENTION

Various approaches have been developed to deal with spent alkaline stripping solutions used in the dry film imaging process of circuit board manufacture. The stripping step of dry film imaging requires that the dry film substrate, that has been photopolymerized, be stripped off the metal substrate. Typically, monoethanolamine and/or a similar aqueous solution(s) is used to perform this step. As a consequence, a solution containing the plastic "dry film" material and various metal components are added into the stripping solution. The problem is to remove the plastic portion from the stripping solution as well as any metal contaminants.

Three basic methods have been developed to treat the used stripper solution. The first approach is to acidify the solution to lower the pH. This precipitates the polymer portion by forming a gummy residue that is difficult to remove by an automated process(es). Furthermore, the acidification, even after the precipitated polymer is removed, still contains organic material that may interfere with the separation of the metal contaminants at a subsequent operation(s).

The second approach is to use acidic salts to lower the pH to a range of about 6.5. While the precipitant of the polymer is easier to deal with in this approach, and may well be automated, a great deal of solids are generated, which now need to be handled and disposed of. If the generated solids do not pass Toxicity Characteristics Leaching Procedure (TCLP) testing, the material will have to be removed and disposed of as hazardous waste material. The generation of solids, according to this second approach, is about three times the quantity of solids generated by the first approach.

The third approach is to use neutral salts. This approach further eases the problems associated with removing the polymer precipitate from the spent stripper solution. However, it leaves a substantial organic component in the solution that interferes with metal decontamination and forms sludge deposits within the processing equipment.

The waste stream resulting from the manufacture of printed circuit boards contains several constituents resulting from the application of the photoresist to the board substrate and subsequent exposure, development, stripping and washing of the substrate. For instance, in a typical process these constituents include metals, such as copper and lead, the dry film photoresist that has been removed from the board along with the stripper and the developer solutions. The developing and stripping solutions may be sodium carbonate, sodium hydroxide, monoethanolamine, or alcohol, for example, or any combination thereof as well as one or more proprietary combinations and/or formulations, such as a formulation sold under the "4045" name by Prata, Inc. of Manchester, N.H., for example. Commercially available fortresses include RISTON 3100 and 3300 Series (available from E. I. du Pont de Nemours and Company, Inc. under the trade names RISTON 3100 and RISTON 3300) and such components are familiar to those skilled in the art.

SUMMARY OF THE INVENTION

The present invention relates to a composition for treating spent dry film stripping and/or developing solution comprising 10 to 70 percent by weight of an aluminum source, e.g. aluminum chloride, aluminum sulfate, polyaluminum chloride, powdered aluminum, a solid aluminum bar or rod, etc. (hereinafter an "aluminum source"); 28 to 95 percent by weight of siliceous particulates, such as sodium potassium aluminum silicate or diatomaceous earth; and 40 percent by weight or less of a dust-suppression agent, such as water, and/or a metal precipitation agent to precipitate the metal from said spent solutions.

The present invention relates to a method where at least an aluminum source and a metal precipitating agent are added to the spent stripping solution. Depending upon the application, those two components may also be combined with a siliceous particulate(s), a dust-suppression agent, an agent(s) to enhance flocculation of the polymer precipitates formed by the use of the composition in spent stripping and/or developed solutions, and/or other additives. These components are added in any order and may be combined prior to their addition. After several minutes of mixing, an acid is metered into the solution to slowly acidify the solution to a pH of less than about 6.5, preferably below a pH of about 6.0, and most preferably at or below a pH of 5.8. This method will remove the photoresist from the spent stripping solution, lower the surfactant level in the solution, does not produce a sticky or tacky precipitate, and will remove copper and/or other metals from the solution to meet the requirements of most local discharge limits.

BRIEF INTRODUCTION TO THE DRAWING

The invention will now be described, by way of example, with reference to the accompanying drawing in which FIG. 1 is a flow diagram showing the method of using the composition according to the present invention.

DETAILED DESCRIPTION OF THE INVENTION

Figure 1:
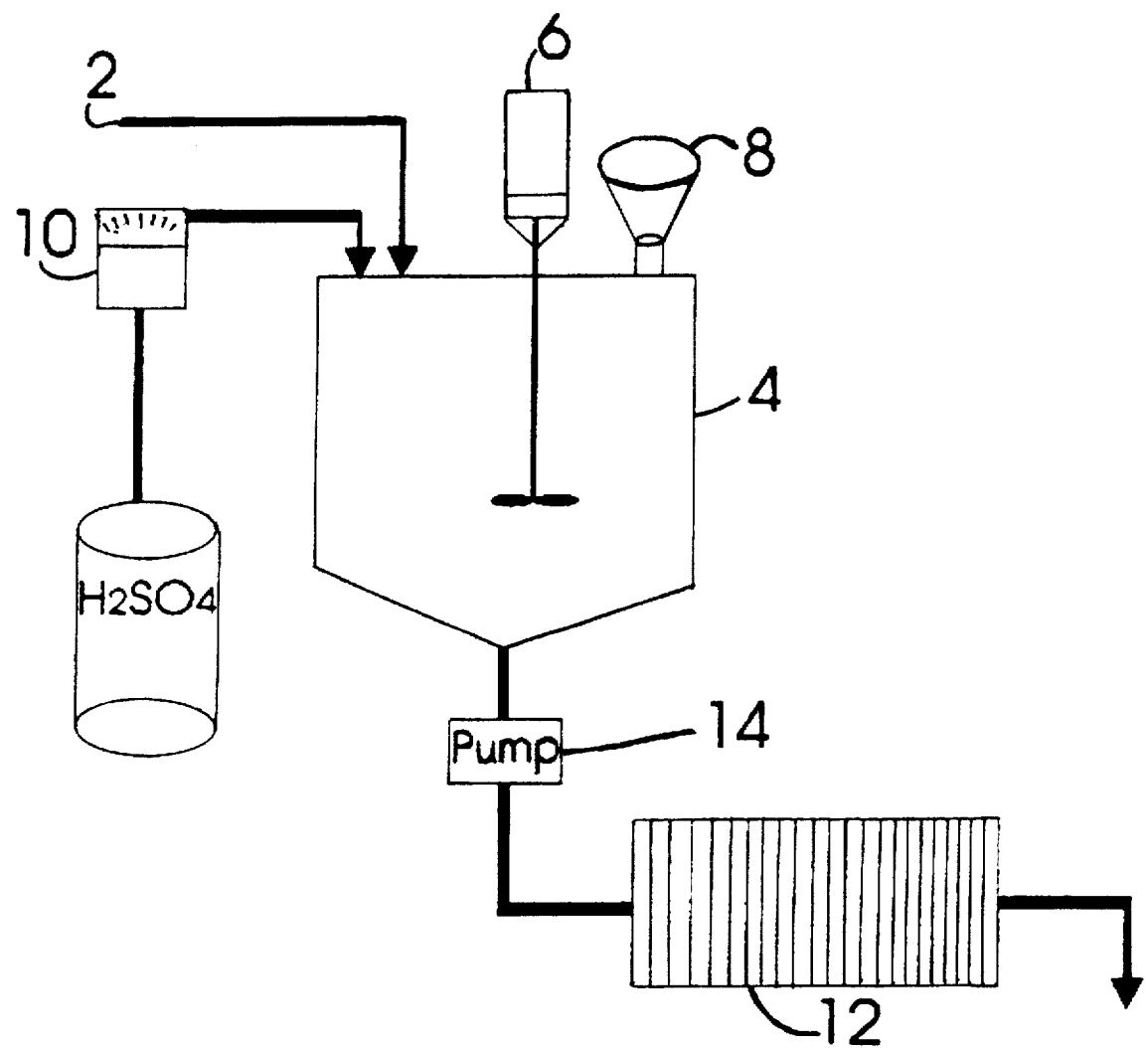

The present invention relates to a composition used to treat stripping solutions used in dry film processing techniques. The composition typically comprises 10 to 70 percent by weight of an aluminum source; 30 to 90 percent by weight siliceous particulate; and less than about 10 percent by weight of a dust-suppression agent. Further agents may be employed as well to precipitate metals and/or enhance flocculating of the polymer precipitates formed by the use of the composition in spent stripping and/or developed solutions.

The employed aluminum source, according to the present invention, is available from a number of commercial suppliers. The type or source of the aluminum is not critical to the effectiveness of the invention and the aluminum may be supplied, for example, by aluminum sulfate, aluminum chloride, polyaluminum chloride, powdered aluminum or a solid aluminum bar or rod, etc.

The siliceous particulates would include diatomaceous earth and sodium potassium aluminum silicate. Diatomaceous earth is commercially available from a number of sources including Eagle Pichen Minerals Inc. of Reno, Nev., for example. Sodium potassium aluminum silicate is also available from a number of commercial sources including Silbrico Corp. of Hodgkins, Ill., for example.

The dust-suppression agent includes water and various aqueous solutions as well as propylene glycol. Dow Chemical of Midland, Mich., for example, provides a propylene glycol suitable for use in the present invention.

Further agents, such as a metal precipitating agent, e.g. trimercapto-s-triazine (e.g. TMT 55 or TMT 15 is sold by Degussa Chemical of Ridgefield Park, N.J.), sodium dimethyldithiocarbamate, starch xanthate, thio red and sodium diethydithiocarbamate, may be included in the composition according to the invention. A flocculating agent(s) in an amount of 1 to 20 percent by weight, such as magnesium hydroxide, may also be employed as part of the composition of the invention.

The composition of the invention is employed by introducing a spent stripping and/or developing solution 2 into a vessel 4 or some other container and stirring the same by a manual or an automated stirring device 6; adding the desired composition of the invention by a suitable dispensing device 8, either sequentially or as a combined mixture, so that a concentration of the composition is effective (in general this will be about 1 pound of dry composition to 30 to 150 gallons of spent stripping solution); adding a sufficient acid (e.g. sulfuric acid, hydrochloric acid, sulfurous acid, or nitric acid) by a suitable pH control and metering pump 10 to lower the pH of the resultant solution below a pH of about 6.5, preferably below a pH of about 6.0, and most preferably at or below a pH of 5.8, and separating the solids from the solution by use of filtration, e.g. a filter press or another suitable filtering device 12. The treated solution is pumped from the vessel 4 to the filter press 12 by way of a pump 14. The following embodiments illustrate various aspects of the invention.

Embodiment 1

A first composition of the invention can be made according to the following formulation:
- 58 weight percent of siliceous particulates or 0.46 to 2.32 grams of siliceous particulates per liter of stripper solution to be treated;
- 38 weight percent of an aluminum source or 0.3 to 1.5 grams of an aluminum source per liter of stripper solution to be treated; and
- 4 weight percent of a dust suppressant or 0.03 to 0.16 grams of a dust suppressant per liter of stripper solution to be treated.

Embodiment 2

A second composition of the invention can be made according to the following formulation:
- 38 to 78 weight percent of siliceous particulates or 0.3 to 3.2 grams of siliceous particulates per liter of stripper solution to be treated:
- 18 to 58 weight percent of an aluminum source or 0.14 to 3.32 grams of an aluminum source per liter of stripper solution to be treated; and
- 0 to 10 weight percent of water or another liquid to prevent dust or 0.08 to 0.4 grams of water or another liquid to prevent dust per liter of stripper solution to be treated.

Embodiment 3

A third composition of the invention can be made according to the following formulation:
- 48 weight percent of siliceous particulates or 0.38 to 1.92 grams of siliceous particulates per liter of stripper solution to be treated;
- 32 weight percent of an aluminum source or 0.25 to 1.28 grams of an aluminum source per liter of stripper solution to be treated; and
- 20 weight percent of trimercapto-s-triazine (TMT) or another suitable metal precipitant or 0.16 to 0.8 grams or trimercapto-s-triazine (TMT) or another suitable metal precipitant per liter of stripper solution to be treated.

Embodiment 4

A fourth composition of the invention can be made according to the following formulation:
- 28 to 68 weight percent of siliceous particulates or 0.22 to 2.72 grams of siliceous particulates per liter of stripper solution to be treated;
- 5 to 35 weight percent of trimercapto-s-triazine or another suitable metal precipitant or 0.04 to 1.4 grams of trimercapto-s-triazine or another suitable metal precipitant per liter of stripper solution to be treated; and
- 15 to 45 weight percent of an aluminum source or 0.12 to 1.80 grams of an aluminum source per liter of stripper solution to be treated.

Embodiment 5

A fifth composition of the invention can be made according to the following formulation:
- 80 weight percent of siliceous particulates or 0.62 to 3.20 grams of siliceous particulates per liter of stripper solution to be treated; and
- 20 weight percent of trimercapto-s-triazine or another suitable metal precipitant or 0.16 to 0.8 grams of trimercapto-s-triazine or another suitable metal precipitant per liter of stripper solution to be treated.

Embodiment 6

A sixth composition of the invention can be made according to the following formulation:
- 65 to 95 weight percent of siliceous particulates or 0.51 to 3.80 grams of siliceous particulates per liter of stripper solution to be treated; and
- 5 to 35 trimercapto-s-triazine or another suitable metal precipitant or 0.04 to 1.4 grams of trimercapto-s-triazine or another suitable metal precipitant per liter of stripper solution to be treated.

Embodiment 7

A seventh composition of the invention can be made according to the following formulation:
- 80 weight percent of an aluminum source or 0.63 to 3.20 grams of an aluminum source per liter of stripper solution to be treated; and
- 20 weight percent of trimercapto-s-triazine or another suitable metal precipitant or 0.16 to 0.8 grams of trimercapto-s-triazine or another suitable metal precipitant per liter of stripper solution to be treated.

Embodiment 8

A eighth composition of the invention can be made according to the following formulation:

65 to 95 weight percent of an aluminum source or 0.51 to 3.80 grams of an aluminum source per liter of stripper solution to be treated; and 5 to 35 trimercapto-s-triazine or another suitable metal precipitant or 0.04 to 1.4 grams of trimercapto-s-triazine or another suitable metal precipitant per liter of stripper solution to be treated.

The compositions according to Embodiments 1 and 2 will remove approximately 75 to 85 percent of the metals in the solution to be treated, and all of the dry film, at a usage rate of 30 to 150 gallons of spent stripper/developer per pound of composition. It is to be appreciated that the metal removal and usage are dependent on which siliceous particulates are employed in the formulation. The compositions of Embodiments 3–8 using trimercapto-s-triazine (TMT) or other metal precipitating agent(s), generally remove metals at a rate of about 98 to 100 percent, dependent upon the metal content of the stripper, the quantity of the composition used, the amount of aluminum in the composition, and the amount of trimercapto-s-triazine (TMT) added to the solution.

Diatomaceous earth is moderately hazardous, especially if frequently inhaled by personnel overseeing the treatment process. For safety reasons, sodium potassium aluminum silicate may be substituted in its place without significantly effecting the usefulness of the composition. The removed solids, both the polymer and metals, will solidify after the filtering/dewatering process.

The compositions, according to the present invention, do not solidify and will not settle out when added to the solution or the fluid to be treated. This feature enhances the ease of use and the effectiveness of the composition.

As indicated above the elements and/or compounds which make up the composition, according to the present invention, may be added separately during the treatment process, e.g. one after another, while still maintaining its effectiveness. Also, the entire composition may not be entirely in powdered form, e.g. it may be partially aqueous, fully aqueous or a powder and an aqueous solution combination.

The liquid form of the chemistry can be easy to utilized when treating the spent stripper solution. Although the liquid form of the aluminum can be mixed with the liquid form of the metal precipitating agent, prior to use, it is to be appreciated that these two liquid components cannot be mixed with one another for an extended period of time, e.g. at the manufacturing or production facility, as the metal precipitating agent will precipitate the aluminum out of the liquid solution. Accordingly, the liquid form of the aluminum and the liquid form of the metal precipitating agent, if they are to be mixed with one another, are only mixed together a relatively short time prior to being added to the solution.

If the metal precipitating agent and the aluminum source are added independently of one another, i.e. not mixed with one another prior to being added to the solution, it is to be appreciated that those components can be added sequentially in any order. The inventor has found the following amounts of the aluminum, in liquid form, and the metal precipitating agent, in liquid form, are suitable for treating spent stripper solution.

The inventor has determined that using the aluminum source in an amount greater than 15 grams per liter of spent stripper solution leads to increased costs and provides no perceivable benefit. Further, the addition of excess an aluminum source generates excess sludge and/or solids in the spent stripper solution.

Use of the metal precipitating agent in an amount greater than 25 grams per liter of spent stripper solution also leads to increased treatment expense without providing any benefit. Moreover, depending upon the type of metal precipitating agent employed to treat the spent stripper solution, toxic or hazardous chemicals can remain in the solution after it has been treated by the chemistry of the present invention.

There are three critical components for effectively treating a spent stripper solution containing metal. The three critical components are:

1) an adequate quantity of metal precipitating agent, i.e. 0.05 to 25 grams per liter of spent stripper solution, more preferably between 0.1 and 5 grams per liter of spent stripper solution, and most preferably between 0.28 and 1.4 grams per liter of spent stripper solution and either 2) an adequate quantity of an aluminum source, i.e. in the range of between 0.01 and 15 grams per liter of spent stripper solution, more preferably between 0.08 and 3.8 grams per liter of spent stripper solution, and most preferably between 1.0 and 2.8 grams per liter of spent stripper solution; and 3) and adequate quantity of siliceous particulates, i.e. in the range of between 0.1 to 10 grams per liter of spent stripper solution and more preferably between 0.1 and 5 grams per liter of spent stripper solution.

In addition to the above three components, the chemistry may contain the other particles or additives, noted above, depending upon the application.

Since certain changes may be made in the above described method of using the chemical composition, without departing from the spirit and scope of the invention here and involved, it is intended that all subject matter contained in the above description shall be interpreted merely as illustrating the inventive concepts herein involved and shall not be construed as limiting the invention.

What is claimed is:

1. A method of treating a spent dry film photoresist stripper/developer solution comprising the steps of:

adding about 0.01 to 15 grams of an aluminum source per liter of solution;

adding about 0.05 to 25 grams of a metal precipitating agent per liter of solution;

adding 0.1 to 10 grams of siliceous particulates per liter of spent stripper solution; and a flocculating agent;

mixing said aluminum source, said metal precipitating agent, said siliceous particulates, and said flocculating agent and said solution with one another to form a mixture;

adding an acid source to said mixture to lower the pH of said mixture to less than about 6.5; and filtering said mixture to separate metals and photoresist from the remainder of said solution.

2. The method of claim 1 further comprising the step of selecting said aluminum source from the group consisting of aluminum sulfate, aluminum chloride, poly aluminum chloride, aluminum chlorhydrate, powdered aluminum and solid aluminum.

3. The method of claim 1 further comprising the step of selecting said metal precipitation agent from the group consisting of trimercapto-s-triazine, sodium dimethyldithiocarbamate, starch xanthate, thio red, sodium diethyldithiocarbamate, sodium sulfide, and calcium dimethyldithiocarbamate.

4. The method of claim 1 further comprising the step of selecting said acid source from the group consisting of sulfuric acid, hydrochloric acid, sulfurous acid, or nitric acid.

5. The method of claim 1 further comprising the step of selecting said siliceous particulates from the group consisting of diatomaceous earth, sodium potassium aluminum silicate and rice hulls.

6. The method of claim 1 further comprising the step of adding at least one of said aluminum source and said metal precipitating agent in liquid form to said solution.

7. The method of claim 1 further comprising the step of adding at least one of said aluminum source and said metal precipitating agent in powdered form to said solution.

8. The method of claim 1 further comprising the step of adding both said aluminum source and said metal precipitating agent in liquid form to said solution.

9. The method of claim 1 further comprising the step of adding both said aluminum source and said metal precipitating agent in powdered form to said solution.

10. A method according to claim 1 further comprising the step of lowering the pH of said mixture, with said acid source, to a pH of less than 6.0.

11. A method of treating a dry film stripper solution comprising the steps of:
adding, to a spent dry film stripper solution, 0.08 to 3.8 grams of an aluminum source per liter of spent stripper solution, 0.1 to 5 grams of siliceous particulates per liter of spent stripper solution, and 0.1 to 5 grams of a metal precipitating agent per liter of spent stripping solution;
mixing said aluminum source, said metal precipitating agent, said siliceous particulates and said solution with one another to form a precipitating solution;
acidifying said precipitating solution to a pH of below 6.5; and
removing solids from said precipitating solution.

12. The method of claim 11 further comprising the step of selecting said siliceous particulates from the group consisting of diatomaceous earth, sodium potassium aluminum silicate and rice hulls.

13. The method of claim 11 further comprising the step of using 0.08 to 2.8 grams of an aluminum source per liter of stripper solution to be treated and 0.28 to 1.4 grams of a metal precipitation agent per liter of stripper solution to be treated.

14. The method of claim 11 further comprising the step of selecting said aluminum source from the group consisting of aluminum sulfate, aluminum chloride, poly aluminum chloride, aluminum chlorhydrate, powdered aluminum and solid aluminum.

15. The method of claim 11 further comprising the step of selecting said metal precipitation agent from the group consisting of trimercapto-s-triazine, sodium dimethyldithiocarbamate, starch xanthate, thio red, sodium diethyldithiocarbamate, sodium sulfide, and calcium dimethyldithiocarbamate.

16. The method of claim 11 further comprising the step of selecting said acid source from the group consisting of sulfuric acid, hydrochloric acid, sulfurous acid, or nitric acid.

17. A method of treating a spent dry film photoresist stripper/developer solution comprising the steps of:
adding about 0.01 to 15 grams of an aluminum source per liter of solution;
adding about 0.1 to 10 grams of siliceous particulates per liter of solution;
adding about 0.05 to 25 grams of a metal precipitating agent per liter of solution, with said metal precipitation agent being selected from the group consisting of trimercapto-s-triazine, sodium dimethyldithiocarbamate, starch xanthate, thio red, sodium diethyldithiocarbamate, sodium sulfide, and calcium dimethyldithiocarbamate;
mixing said aluminum source, said siliceous particulates, said metal precipitating agent and said solution with one another to form a mixture;
adding an acid source to said mixture to lower the pH of said mixture to less than about 6.5; and
filtering said mixture to separate metals and photoresist from the remainder of said solution.

18. The method of claim 17 further comprising the step of selecting said acid source from the group consisting of sulfuric acid, hydrochloric acid, sulfurous acid, or nitric acid.

19. The method of claim 17 further comprising the step of selecting said siliceous particulates from the group consisting of diatomaceous earth, sodium potassium aluminum silicate and rice hulls.

* * * * *